US006481627B1

(12) United States Patent
Guerreri

(10) Patent No.: US 6,481,627 B1
(45) Date of Patent: Nov. 19, 2002

(54) FLEET REFUELING METHOD AND SYSTEM

(75) Inventor: Stephen J. Guerreri, Cary, NC (US)

(73) Assignee: Electronic Warfare Associates, Inc., Herndon, VA (US)

( * ) Notice: Subject to any disclaimer, the term of this patent is extended or adjusted under 35 U.S.C. 154(b) by 0 days.

(21) Appl. No.: 09/255,656

(22) Filed: Feb. 23, 1999

(51) Int. Cl.[7] .................................................. G06K 7/10

(52) U.S. Cl. .................. 235/472.01; 235/470; 705/413

(58) Field of Search ................................ 235/375, 376, 235/387, 384, 441, 462.01, 462.13, 462.45, 470, 472.01; 700/232, 240; 702/188; 705/413

(56) References Cited

U.S. PATENT DOCUMENTS

| | | | | |
|---|---|---|---|---|
| 3,536,109 A | | 10/1970 | Ginsburgh et al. | 141/98 |
| 3,629,858 A | | 12/1971 | Hayakawa et al. | 340/172.5 |
| 3,650,303 A | | 3/1972 | Chambers et al. | 141/1 |
| 3,814,148 A | * | 6/1974 | Wostl | 141/98 |
| 4,067,061 A | | 1/1978 | Juhasz | 364/900 |
| 4,072,929 A | | 2/1978 | Garmong | 340/147 |
| 4,133,034 A | | 1/1979 | Etter | |
| 4,313,168 A | * | 1/1982 | Stephens et al. | 705/413 |
| 4,345,146 A | * | 8/1982 | Story et al. | 235/381 |
| RE31,089 E | | 11/1982 | Adamson | 340/825.55 |
| 4,263,945 A | | 4/1984 | Van Ness | 141/98 |
| 4,469,149 A | | 9/1984 | Walkey et al. | 141/94 |
| 4,482,964 A | | 11/1984 | Berstein et al. | 364/465 |
| 4,490,798 A | | 12/1984 | Franks et al. | 364/550 |
| 4,527,600 A | | 7/1985 | Fisher et al. | 141/4 |
| 4,658,371 A | | 4/1987 | Walsh et al. | 364/550 |
| 4,827,426 A | | 5/1989 | Patton et al. | 364/479 |
| 4,911,330 A | | 3/1990 | Vlaanderen et al. | 222/132 |
| 5,113,351 A | | 5/1992 | Bostic | 364/479 |
| 5,133,076 A | | 7/1992 | Hawkins et al. | |
| 5,154,314 A | | 10/1992 | Van Wormer | 222/1 |
| 5,156,198 A | | 10/1992 | Hall | 141/94 |
| 5,270,943 A | | 12/1993 | Warn | 364/479 |
| 5,272,321 A | | 12/1993 | Otsuka et al. | 235/381 |
| 5,283,943 A | | 2/1994 | Aguayo et al. | 29/701 |
| 5,304,744 A | | 4/1994 | Jensen | 177/136 |
| 5,337,253 A | | 8/1994 | Berkovsky et al. | 364/479 |
| 5,359,522 A | | 10/1994 | Ryan | 364/465 |
| 5,360,139 A | | 11/1994 | Goode | 222/40 |

(List continued on next page.)

FOREIGN PATENT DOCUMENTS

| | | | |
|---|---|---|---|
| DE | 41 24243 A1 | | 1/1993 |
| EP | 0 035 888 A2 A3 | | 9/1981 |
| EP | 0 349 711 A2 A3 | | 1/1990 |
| EP | 0 456 425 A1 | | 11/1991 |
| EP | 0 476 858 A1 | | 3/1992 |
| EP | 0 456 425 B1 | | 8/1994 |
| EP | 2 293 658 A | | 4/1996 |
| EP | 0 736 484 A2 | | 10/1996 |
| FR | 2 600 318 | * | 12/1987 |
| JP | 5-51100 | * | 3/1993 |

OTHER PUBLICATIONS

PCT Search Report for International Patent Application No. PCT/US01/25168, dated Nov. 15, 2001.

*Primary Examiner*—Michael G. Lee
*Assistant Examiner*—Jared J. Fureman
(74) *Attorney, Agent, or Firm*—Pillsbury Winthrop LLP

(57) ABSTRACT

A system and method for facilitating delivery of fuel to a customer site with a delivery truck. A hand-held device captures an identifier specific to the given customer. A zero flow of fuel being transferred from the delivery truck to a customer storage tank is sensed, and the fuel delivery is tagged for billing to the customer based upon when the zero flow is sensed in relation to when the identifier is captured. The hand-held device is used to log the identifier and an identification time at which the identifier is captured. A computer is provided on-board the delivery truck, and logs zero flow indications and the respective zero flow times. The system determines which ones of the zero flow times are after the identification time but before a next occurring identification time at which the hand-held device captures a next identifier.

18 Claims, 4 Drawing Sheets

U.S. PATENT DOCUMENTS

| | | | | | |
|---|---|---|---|---|---|
| 5,383,500 | A | | 1/1995 | Dwars et al. | |
| 5,394,336 | A | | 2/1995 | Warn et al. | 364/479 |
| 5,400,253 | A | | 3/1995 | O'Connor | 364/442 |
| 5,416,706 | A | | 5/1995 | Hagenbuch | 364/424.07 |
| 5,420,797 | A | * | 5/1995 | Burns | 700/232 |
| 5,471,042 | A | | 11/1995 | Kirkeby et al. | |
| 5,579,233 | A | * | 11/1996 | Burns | 700/240 |
| 5,605,182 | A | | 2/1997 | Oberrecht et al. | 141/94 |
| 5,650,930 | A | | 7/1997 | Hagenbuch | 364/421.07 |
| 5,679,943 | A | | 10/1997 | Schultz et al. | |
| 5,700,999 | A | * | 12/1997 | Streicher et al. | 235/381 |
| 5,706,273 | A | | 1/1998 | Guerreri | 364/510 |
| 5,913,180 | A | | 6/1999 | Ryan | 702/45 |
| 6,023,147 | A | | 2/2000 | Cargin, Jr. et al. | |
| 6,045,040 | A | * | 4/2000 | Streicher et al. | 235/381 |
| 6,047,250 | A | * | 4/2000 | Beaudoin et al. | 702/188 |
| 6,070,453 | A | | 6/2000 | Myers | 73/40.5 |
| 6,085,805 | A | | 7/2000 | Bates | 141/94 |
| 6,097,606 | A | | 8/2000 | Groves et al. | |
| 6,112,981 | A | | 9/2000 | McCall | 235/375 |
| 6,144,848 | A | | 11/2000 | Walsh et al. | |
| 6,370,488 | B1 | * | 4/2002 | Beaudoin et al. | 702/188 |

* cited by examiner

FLEET REFUELING METHOD AND SYSTEM

BACKGROUND OF THE INVENTION

1. Field of the Invention

The present invention relates to systems and methods for delivering fuel and tracking delivery information such as the number of gallons delivered and the identity of the unit to which the fuel was delivered.

2. Description of Background Information

During fleet refueling, a customer will contract with a fleet refueling company to refuel the storage tanks at a given customer site. The storage tanks may be stand alone tanks and/or tanks provided as part of vehicles or machines, such as trucks, cars, construction equipment, generators, and so. As part of this process, the refueling company will track delivery information including the volume and type of fuel transferred into each storage tank, and use the delivery information for accounting and billing and to prepare a customer ticket.

While refueling the storage tanks at a given customer site, the operator will drag a hose from the delivery truck, insert the hose nozzle into the storage tank's spigot, and actuate a fuel pump to effect the fuel transfer. The operator then manually records, among other information, the storage tank's identity and the quantity delivered. The operator may not be able to see a volume meter while refueling the storage tank. Thus, before recording each volume amount, the operator will need to return to the delivery truck to view the truck's volume meter. Some refueling companies mount a small volume display on the end of the hose to save the operator from having to return to the truck each time a delivery volume is recorded.

The operator is responsible for accurately recording the delivery information for each refueled storage tank and each customer site. The delivery information then needs to be reentered into a computerized accounting and billing system. The reentry process is costly, and will frequently introduce errors into the data.

U.S. Pat. No. 5,579,233 to Burns discloses a method for refueling vehicle (or other) tanks using electronic identification tags, a reading probe, and an on-board computer.

Customer sites and vehicle tanks are provided with electronic identification tags comprising passive ROM devices, each storing identifying information. A portable hand-held digital probe is used to identify a given customer site and individual tanks by reading affixed passive ROM devices. When the operator arrives at a customer site, the operator uses the probe to interrogate the customer site's passive ROM device. Before refueling a given vehicle tank, the operator uses the probe to touch the vehicle's passive ROM device and to then touch a passive ROM device provided on the delivery truck to confirm that the operator is using the correct fuel.

After finishing refueling of all vehicles or storage tanks at a particular customer site, the operator will insert the hand-held probe into a downloader of the on-board computer, and transfer the vehicle data recorded in the hand-held probe to the on-board computer. The transferred data is later correlated with volume data recorded by the on-board computer.

SUMMARY OF THE INVENTION

In view of the above, the present invention, through one or more of its various aspects and/or embodiments, is thus presented to accomplish one or more objects and advantages such as those noted below.

An object of the present invention is to improve upon systems and methods for fleet refueling and the gathering of refueling data, while simplifying the duties of the personnel involved.

The present invention, therefore, is directed to a system or method, or one or more parts thereof, for facilitating a refueler's delivery of fuel to a customer's site with the use of a delivery truck. A delivery hose is used to transfer fuel from the delivery truck to a customer storage tank of a given customer. A hand-held device is used to capture an identifier specific to the given customer. A zero flow of the fuel transferred from the delivery tank to the customer storage tank is sensed. The fuel delivery is associated with the given customer based upon when the zero flow is sensed in relation to when the identifier is captured.

The hand-held device is used to log, in the memory provided within the hand-held device, the identifier and an ID time at which the identifier is captured. A computer provided on-board the delivery truck is used to log, in the memory provided on-board the delivery truck, zero flow indications and respective zero flow times at which the zero flow indications occur. A determination is made as to which of the zero flow times are after the ID time but before a next occurring time at which the hand-held device captures the next identifier. The identifier may identify a particular storage tank of the given customer, while the next identifier may identify either a next storage tank of the given customer or a storage tank of a next customer.

The above-listed and other objects, features, and advantages of the present invention will be more fully set forth hereinafter.

BRIEF DESCRIPTION OF THE DRAWINGS

The present invention is further described in the detailed description which follows, by reference to the noted plurality of drawings, by way of non-limiting example embodiments of the present invention, in which like reference numerals represent similar parts throughout the several views of the drawings, and wherein.

DETAILED DESCRIPTION OF THE EXEMPLARY EMBODIMENT

Figure 1:
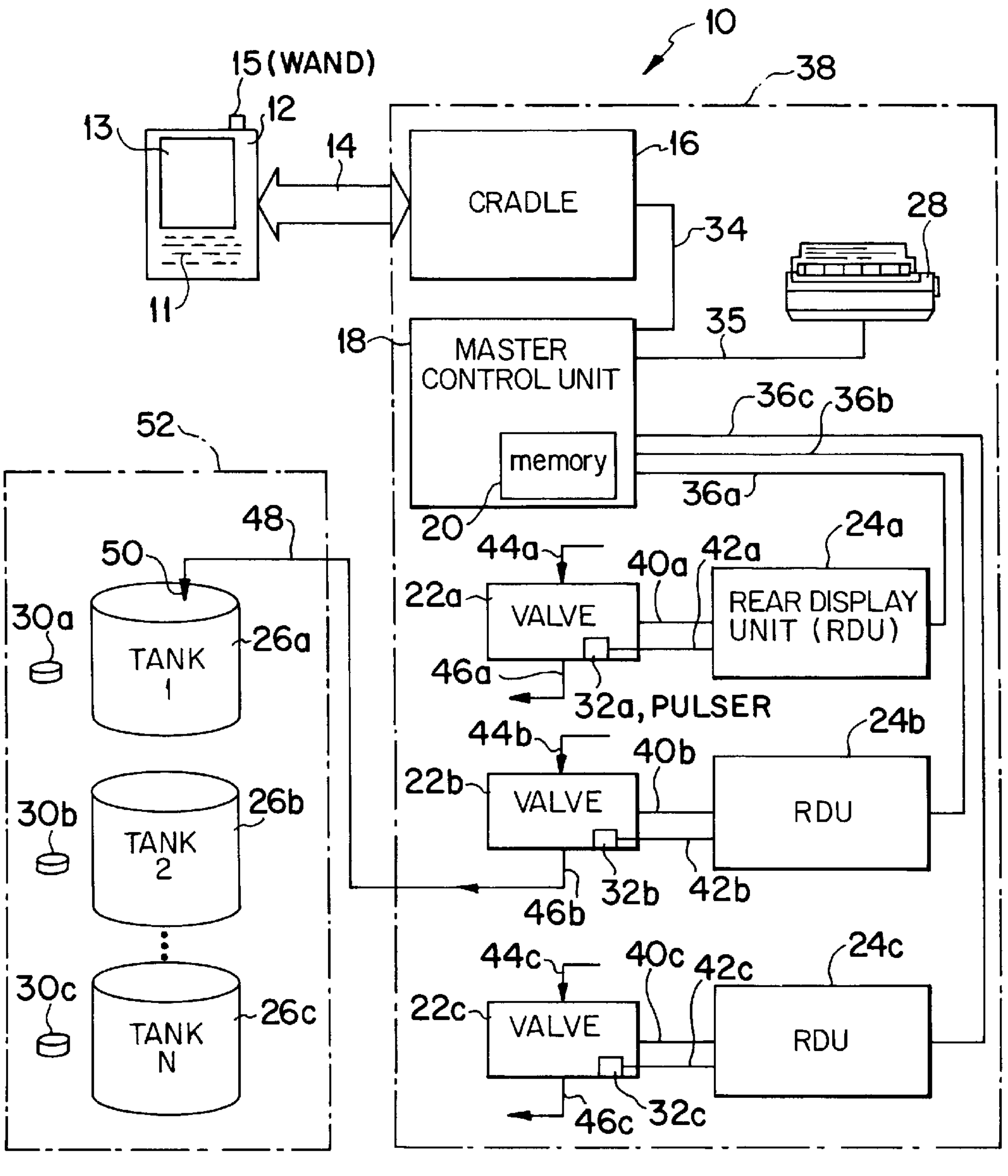
FIG. 1 is a block diagram of a fleet refueling system according to the illustrated embodiment.

Referring now to the drawings in greater detail, FIG. 1 shows an illustrated embodiment of a fleet refueling system 10. The system comprises a portable portion (a hand-held computer 12) together with an on-board subsystem 38 transported by a delivery truck. On-board system 38 comprises a master control unit 18 located in the delivery truck's cab, and several fuel delivery units each located at the rear of the truck.

Hand-held computer 12 comprises a keypad 11, a display interface 13, a wand 15, and a mechanism for forming a communication link 14, which in the illustrated embodiment comprises an infra-red link. Hand-held computer 12 interfaces with a cradle 16 connected to a master control unit 18 via a serial cable 34. Master control unit 18 is coupled to, among other elements (not shown), a printer 28, and a plurality of rear display units (RDUs) 24*a*, 24*b*, and 24*c*. Master control unit 18 comprises, among other elements, a memory 20. A plurality of respective valves 22*a*, 22*b*, and 22*c* are connected to corresponding RDUs 24*a*, 24*b*, and 24*c*. More specifically, each valve 22*a*–22*c* is coupled to its respective RDU 24*a*–24*c* via a valve control connection 40*a*–40*c* and a pulser connection 42*a*–42*c*. Each valve 22*a*–22*c* comprises an inlet 44*a*–44*c* and a respective outlet 46*a*–46*c*. Each inlet 44*a*–44*c* is coupled to a respective fuel pump and corresponding fuel transport tank (not shown) provided on-board the delivery truck 38, and each respective outlet 46*a*–46*c* is coupled to a hose 48 which comprises a nozzle 50 actuable to control the flow of fuel into a storage tank 26*a*, 26*b*, or 26*c*.

Cradle 16, master control unit 18, RDUs 24*a*–24*c*, printer 28, and each of valves 22*a*–22*c* are part of on-board system 38.

N fuel storage tanks 26*a*–26*c* (storage tanks 1, 2, and N are shown) are located at a particular customer site 52, and corresponding passive identification (ID) devices (buttons) 30*a*–30*c* are provided either on or adjacent their respective storage tanks 26*a*–26*c*. In the illustrated embodiment, passive ID devices 30*a*–30*c* comprise touch buttons, such as the iButton sold by Dallas Semiconductor, Inc., which comprises a non-volatile RAM that can be read from with the use of a touch button wand. These passive ID devices 30*a*–30*c* each comprise identifying information pertaining to the customer, or more specifically pertaining to the customer site. In the illustrated embodiment, a separate passive ID device 30*a*–30*c* is provided for each storage tank. Thus, each passive ID device holds information uniquely identifying its storage tank.

The touch buttons may comprise the DS 1990A (DS 1420) 64-Bit ROM iButton which has a unique unalterable 64-Bit unique registration number engraved both on a silicon chip and on the steel lid of the button. Other read-write memory buttons may be utilized as well—such as the DS 1991 (DS 1425) 1 K Bit password-protected memory iButton.

The hand-held computer 12 may comprise, for example, a PEN*KEY® 6100 hand-held computer by NORAND®, which comprises a 386 33 MHz processor and enhanced power management capabilities for prolonged battery life. The 6100 hand-held computer is also provided with a standard IrDA interface for wireless communication. Cradle 16 may comprise the NORAND® 6100 dock, which is compatible with the 6100 hand-held computer. In any event, it is preferred that hand-held computer 12 comprise a rugged, yet small computer having sufficient processing power and speed, as well as local memory capabilities. In the illustrated embodiment, which utilizes a 6100 computer, hand-held computer 12 comprises 8 MB FLASH memory and 16 MB of RAM.

Hand-held computer 12 and master control unit 18 are each provided with an application program interface (API) for facilitating the seamless running of a fleet refueling application. In the illustrated embodiment, master control unit 18 comprises its own microprocessor, and performs such functions as computing delivery quantities, providing temperature-volume compensation, and utilizing a 10 point linearization technique to compensate for variable flow rates. Master control unit 18 comprises mechanisms for handling data transfers, for example, to printer 28 via printer cable 35, to an internal memory 20, to an external disk storage (not shown), and to a centralized accounting system by a radio transmission.

Each rear display unit (RDU) 24*a*–24*c* serves as a fuel volume measuring unit, and comprises a digital display which displays information concerning the current delivery from a fuel transport tank corresponding to its associated valve 22*a*–22*c*. The volume delivered by its associated valve 22*a*–22*c* will be displayed. Each RDU 24*a*–24*c* also relays pulses it receives from a respective pulser 32*a*–32*c*, and forwards such pulses to master control unit 18 by way of a corresponding fiber optic link 36*a*–36*c*. Each RDU 24*a*–24*c* is further provided with a mechanism for controlling the opening and closing of its associated valve via a valve control connection 40*a*–40*c*, and receives temperature information from respective temperature probes (not shown) so that temperature information can be taken into account in calculating the volume of fuel being delivered. Each RDU 24*a*–24*c* may be provided with additional control interface mechanisms for allowing the operator to initiate various activities without the direct use of master control unit 18 or hand-held computer 12. For example, each RDU 24*a*–24*c* may be provided with a print button for initiating the printing of tickets before the operator returns to master control unit 18 located in the cab of the delivery truck.

By using fiber optic cables 36*a*–36*c*, the data is transferred to master control unit 18 without the noise and attenuation caused by electrical cables.

Each RDU 24*a*–24*c* may be configured to display in real-time such information as the delivery volume, the fuel temperature, the rate of flow, and the total volume delivered for its associated fuel transport tank for a given customer site.

When delivering fuel, an operator will use a delivery hose 48 to transfer fuel from a delivery tank (not shown) to a given customer storage tank 26*a* of a given customer site 52. Hand-held computer 12 is used to capture an identifier specific to customer site 52. More specifically, in the illustrated embodiment, it captures an identifier specific to the given storage tank 26*a*. Hand-held computer 12 puts its wand 15 in close proximity to touch button 30*a*, which allows wand 15 to capture the identification information stored within touch button 30*a*. Hand-held computer 12 also logs the time at which the identification information is captured. In the meantime, master control unit 18 senses a zero flow of the fuel from the fuel transport tank being used to refuel the given storage tank 26*a*. The fuel delivery is tagged for billing to a particular customer based upon when the zero flow is sensed in relation to when the identifier was captured for that customer site 52. More specifically, master control unit 18, provided in the cab of the delivery truck, is used to log, in memory 20, zero flow indications and respective zero flow times at which the zero flow indications occur. Hand-held computer 12 is placed in cradle 16 for establishing a communication with master control unit 18 once the delivery is finished for the given customer site 52. At this time, hand-held computer 12 will determine which ones of the zero flow times, logged by master control unit 18, are after the ID time at which the identifier is captured for the given storage tank 26*a* but before a next occurring ID time at which hand-held computer 12 captures a next identifier.

In the illustrated embodiment, a separate identifier is provided for each storage tank. Alternatively, one identifier may be provided per customer site. Also, separate individual passive ID devices 30*a*–30*c* may be provided for each corresponding storage tank 26*a*–26*c*, while a separate customer site indicating passive ID device (not shown) may be provided for capturing the identification of the customer site 52 before then capturing the identification of each storage tank 26*a*–26*c*. Hand-held computer 12 comprises a touch-sensitive screen 13 which serves as a graphical-user-interface activated by touching options or icons on the screen.

While the embodiment disclosed herein uses passive ID devices and wands for identifying customers, customer sites, and/or storage tanks, other mechanisms may be used to capture such identifiers. For example, an identifier may be captured by: touching a bar code with a bar code reading wand coupled to the hand-held device, an operator uttering a unique identifier into a microphone coupled to the hand-held device, or an operator inputting a unique identifier into a touch pad of the hand-held device. The unique identifier may comprise a license plate number of a vehicle being refueled.

Figure 2:
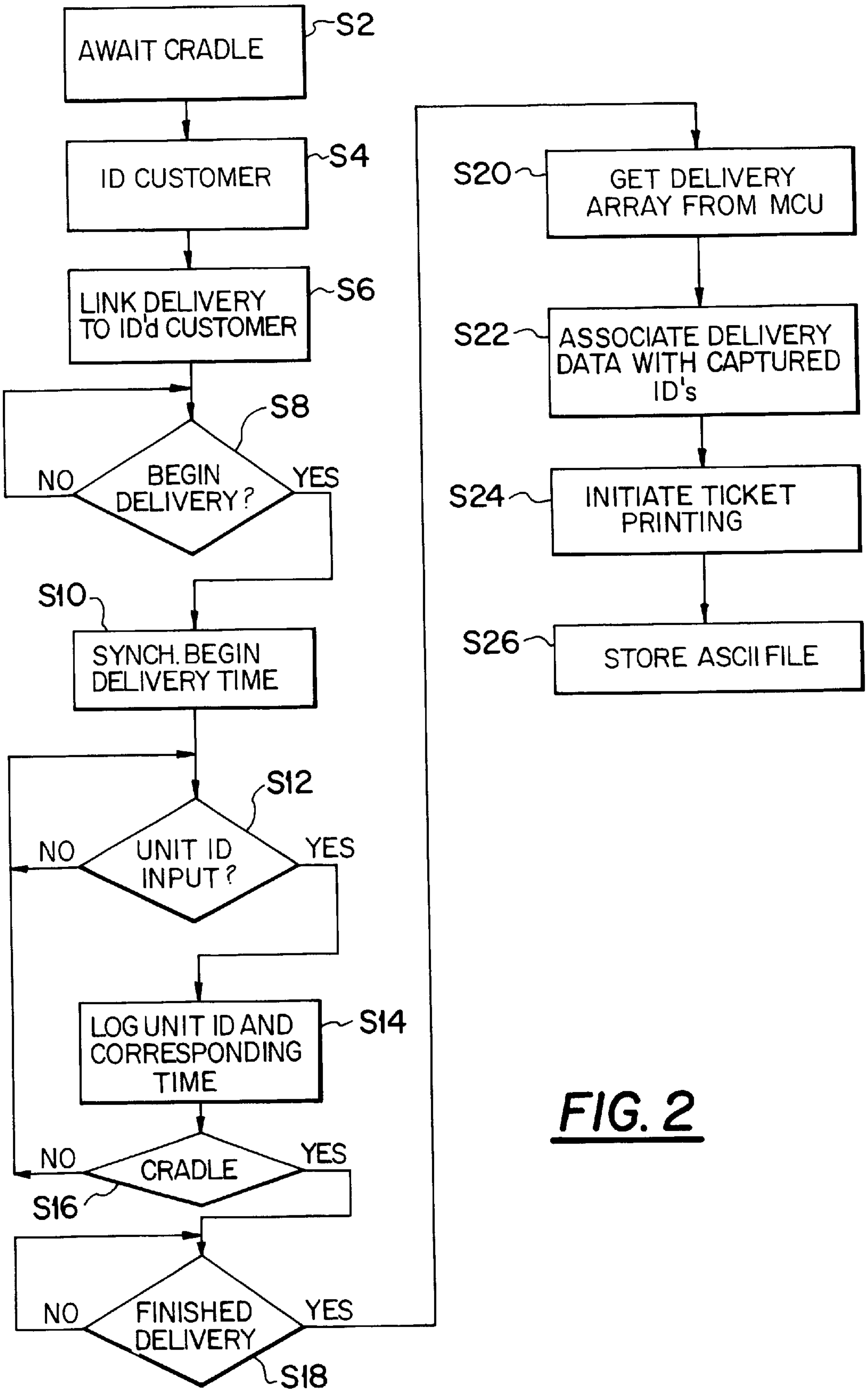
FIG. 2 is a flowchart showing several process steps performed by a hand-held computer.

FIG. 2 provides a flowchart of several process steps performed by the hand-held computer 12 during fleet refueling. In the first step S2, an application within hand-held computer 12 will await docking of hand-held computer 12 within cradle 16. Then, in step S4, the operator may choose the particular customer corresponding to customer site 52 from a list kept in an internal database (e.g., stored in memory 20), or the operator may optionally enter a customer as a "new customer" and manually enter the customer's information into the database stored in memory 20. At that point, in step S6, an appropriate indication will be logged identifying this particular delivery sequence as corresponding to the identified customer. In step S8, hand-held computer 12 will wait for the operator to touch the "Begin Delivery" touch screen button on screen 13. If the "Begin Delivery" touch screen button is touched, the process will proceed to step S10. If not, the process will wait until the "Begin Delivery" touch screen button is activated. In step S10, the hand-held computer will log the begin delivery time, and will notify master control unit 18 to begin delivery.

Then, in step S12, a determination is made as to whether a unit ID has been input through wand 15. If not, hand-held computer 12 will simply wait. If a unit ID has been input, the process will proceed to step S14, at which point the unit ID and the corresponding ID time at which the unit ID was captured will each be logged in the RAM within hand-held computer 12.

In the next step S16, a determination is made as to whether the hand-held computer has been docked in cradle 16. If not, the process returns to step S12, and awaits the input of another unit ID. If hand-held computer 12 has been docked in cradle 16, the process proceeds to step S18, where a determination is made as to whether the operator has actuated the "Finished Delivery" touch screen button on display interface 13. If not, step S18 will repeat itself. If the "Finished Delivery" indication has been activated by the operator, the process will proceed to step S20, at which point hand-held computer 12 will obtain a delivery array from master control unit 18.

During the execution of steps S12 and S14, hand-held computer maintains an array ButtonInfo [ReadTime(j), UnitInformation(j)], which comprises an array of entered read times at which wand 15 is utilized to gather unit information corresponding to each refueled unit (storage tank). The unit information in the illustrated embodiment comprises an alphanumeric indicator of the unique identification of the interrogated unit (storage tank). Other unit information may be provided within the passive ID device such as an indication as to whether the delivered fuel is taxable or not, and the type of fuel that should be placed in the identified storage tank (in which case, if there is a mismatch, a warning can be issued to the operator). In addition, the unit information stored in each passive ID device may comprise a customer site identifier. This way, the operator can start refueling any given storage tank at a customer site 52, and both the customer and customer site can be identified by reading one passive ID device 30*a*–30*c*.

The fuel type information stored in passive ID device 30 may be correlated with the fuel type delivered to that storage tank, and if an improper delivery has been made, a warning may be issued to the operator.

Meanwhile, master control unit 18 gathers and maintains an array of information concerning the delivery of fuel, i.e., DeliveryArray [StoppedTime(i), Volume(i)]. Each stopped time (StoppedTime (i)) comprises a time in which the flow of fuel is stopped for at least one second; and each volume value (Volume (i)) represents a corresponding incremental volume.

In step S22, the delivery data, stored in the delivery array, is associated with the captured identifying information in the button information array. That is, each of the incremental volume values, and other delivery information that may be obtained and maintained in the delivery array, is associated with a particular customer, customer site, and/or unit (storage tank) for reporting and accounting purposes. In the next step S24, a hand-held computer 12 will initiate printing of a ticket by communicating with master control unit 18 to operate the printing of the ticket with printer 28 via printer cable 34. In step S26, the customer information, including the customer identification, customer site identification, and storage tank identifiers, is stored together with its associated delivery data into an ASCII file which can be later uploaded to a central office accounting system, for example, with the use of a memory card, a radio transmission link, or a telecommunications line connection.

Figure 3:
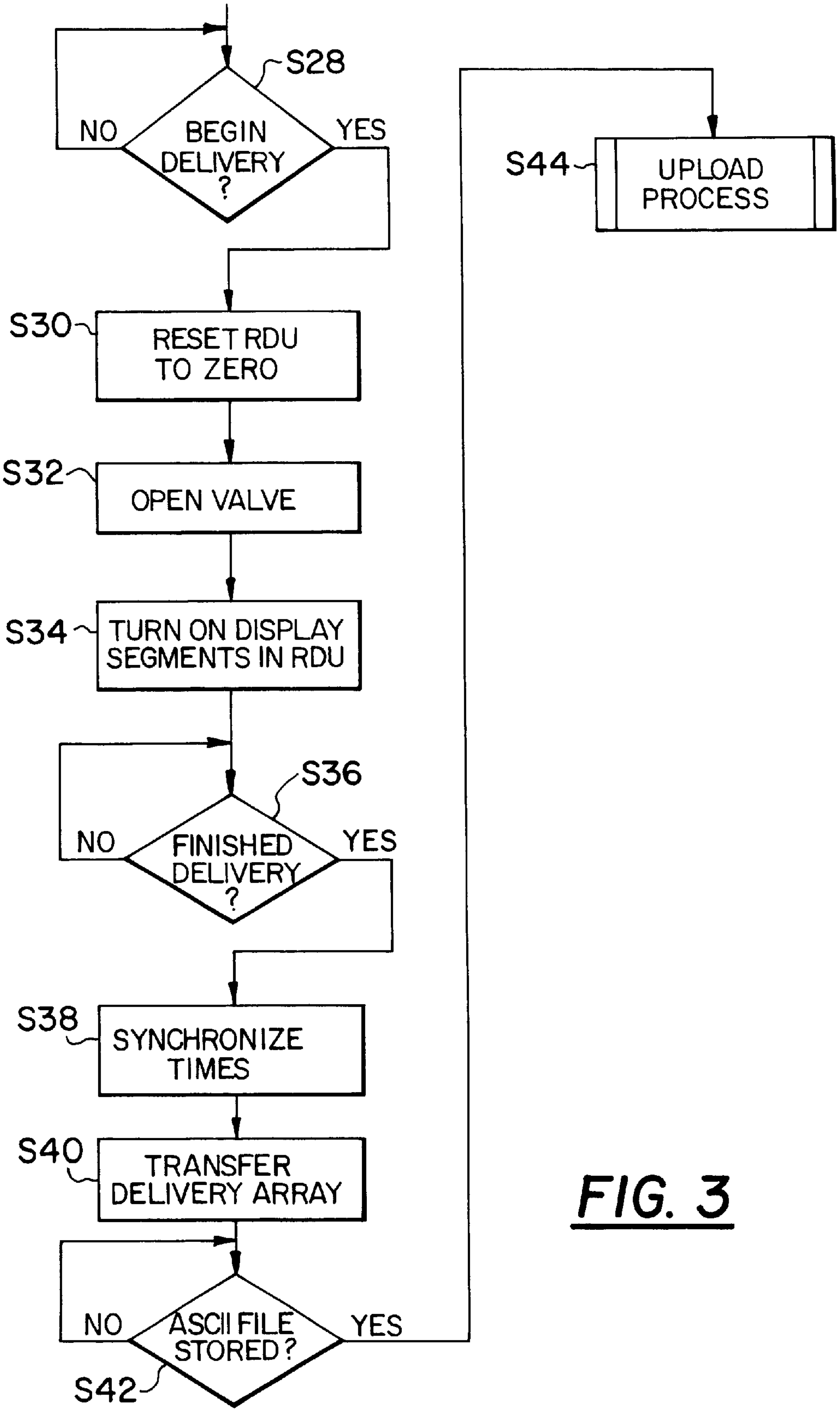
FIG. 3 is a flowchart showing several process steps performed by a master control unit.

FIG. 3 is a flowchart of several process steps performed by master control unit 18. In a first step S28, a determination is made as to whether a Begin Delivery instruction has been actuated by the operator via display interface 13 of hand-held computer 12. If so, the process proceeds to step S30, at which point master control unit 18 will reset the RDU 24*a*–24*c* corresponding to the fuel transport tank holding the fuel to be delivered to zero (i.e., reset the volume display indicator of the appropriate RDU 24*a*–24*c* to display a zero value), start the fuel pump (not shown), and perform the necessary weights and measures operations pertaining to the fuel delivery and measurement process.

In step S32, the appropriate valve 22*a*–22*c* is opened, and the fuel pump (not shown) is activated, causing the fuel to flow into hose 48 to be ready for dispensing via the hose nozzle 50 into the target storage tank 26*a*–26*c*. In step S34, master control unit 18 instructs the appropriate RDU 24*a*–24*c* to turn on its display segments. In step S36, a determination is made as to whether the operator has touched the Finished Delivery touch screen button on display interface 13 of hand-held computer 12. If so, the process proceeds to step S38. If not, the process will simply await the Finished Delivery indication to be activated.

In step S38, the Begin Delivery times logged by hand-held computer 16 and master control unit 18 are synchronized. This allows for clock drifting between hand-held computer 12 and master control unit 18 to be compensated for. In the illustrated embodiment, the application programs provided in each of hand-held computer 12 and master control unit 18 represent time in terms of a number of timer ticks (in seconds) since 1970. The number of digits used to represent this number are such that the time can be accurately represented in this way for up to 134 years after 1970.

At step S40, the delivery array is transferred to hand-held computer 12 via cradle 16 and communication link 14. At step S42, master control unit 18 determines whether an ASCII file has been stored by hand-held computer 12 in memory 20. If the ASCII file has been stored, the process proceeds to step S44, which comprises an upload process for carrying out the uploading of the ASCII file to a central office accounting system where the data will be used for accounting and other purposes.

The operator activates the Begin Delivery button when beginning delivery for a particular customer or a customer site, depending upon the manner in which information is divided among tickets. For example, if the operator wishes to generate a separate ticket for each customer site, regardless of whether the customer sites belong to the same customer, the operator can initiate the Begin Delivery sequence at the beginning of each customer site, and press Finish Delivery at the end of each customer site. On the other hand, if one ticket is desired for a single customer among multiple customer sites, provided those customer sites are delivered in sequence, the operator can simply press the Begin Delivery button on display interface 13 at the beginning of the first customer site for that customer and press the Finish Delivery button at the end of the last customer site for that customer.

A printed ticket may comprise information such as the identification numbers of the individual units refilled, the quantity delivered for each unit, and the time and date of the overall delivery. More or less information may be provided on the ticket as desired. Alternatively, or in addition, an electronic indication may be forwarded to the customer; for example, an e-mail message or a fax may be sent to the customer contemporaneously during the delivery shift of the operator.

As noted above, master control unit 18 keeps a delivery array of stop times and incremental volume values. It should be noted that the flow of fuel transferred to a given storage tank *26a–26c* can stop many times for a duration of greater than 1 second. This may occur if the operator attempts to "top" the fuel tank by squeezing the pump handle 50 momentarily. This, however, does not affect the accuracy of the volume measurements, as the fuel delivered to a given storage tank is tracked based upon when a zero flow is sensed in relation when the identifier for that storage tank *26a–26c* is captured.

This association is carried out in step S22 of the flowchart illustrated in FIG. 2 by hand-held computer 12, by comparing the information in the button information array gathered and maintained by hand-held computer 12, with the information in the delivery array gathered and maintained by master control unit 18. More specifically, when associating these sets of information, hand-held computer 12 determines which ones of the zero flow times are after a given identification time but before a next occurring identification time at which hand-held computer 12 captures a next identifier. In this instance, the preceding identification time which precedes the one or more zero flow times will be the identification that corresponds to the incremental volume values. The amount of fuel transferred to a given unit can be determined by simply subtracting from the incremental volume corresponding to the last zero flow occurrence (i.e., the last volume value), the last incremental volume for the immediately preceding identified unit.

Figure 4:
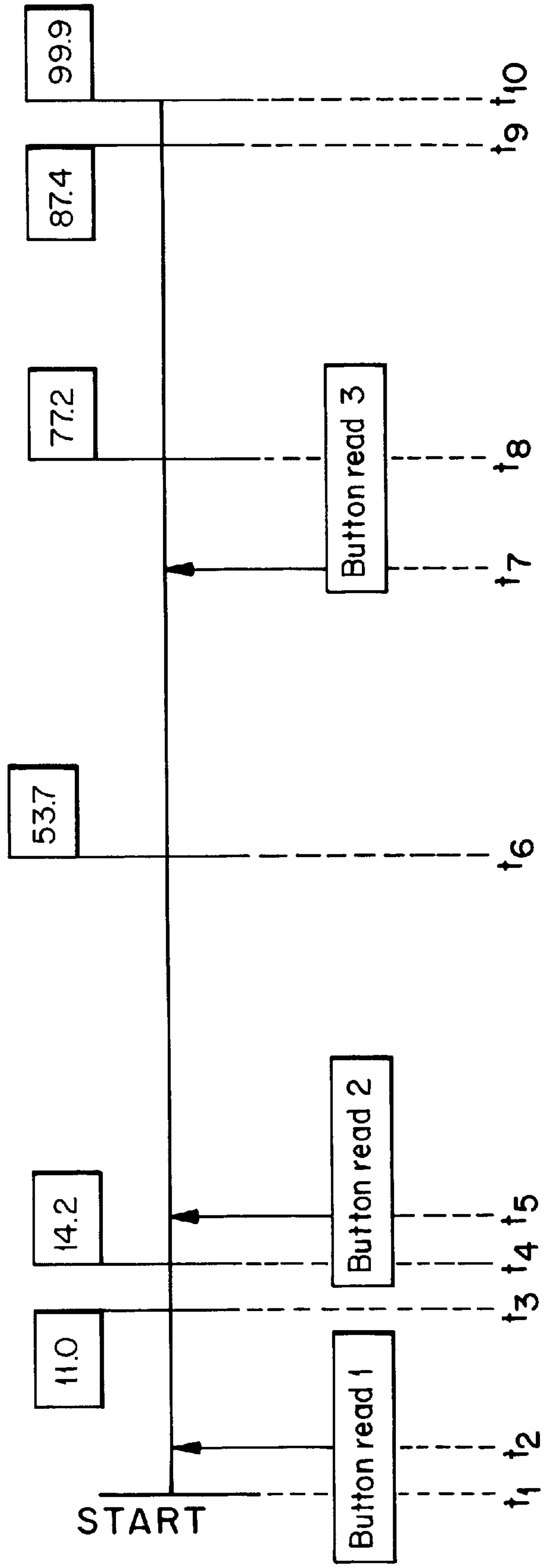
FIG. 4 is a time line diagram of an example delivery sequence.

FIG. 4 illustrates an example time line of a delivery sequence. The operator starts the delivery sequence by pressing the Begin Delivery button on display interface 13 at an initial time $t_1$. A first button is read at a time $t_2$. Zero flow indications are sensed at respective times $t_3$ and $t_4$. A next button is read at a time $t_5$, after which a single zero flow indication is sensed at a time $t_6$. A next button is read at a time $t_7$, after which three zero flow indications are sensed at the respective times of $t_8$, $t_9$, and $t_{10}$. The flagged numbers corresponding to the zero flow indications represent the total volume delivered from the starting time ti until the time at which the fuel flow stopped.

As noted above, a zero flow is deemed to have occurred when the flow has stopped for a minimum stop time (1 second in the illustrated embodiment). The system can be configured to change the manner in which a zero flow is determined, by changing the minimum stop time, or by modifying the manner in which a zero flow is considered to have occurred, e.g., taking into consideration factors such as the rate of change of flow leading to a zero flow indication.

In the illustrated example shown in the time line of FIG. 4, button 1 represents unit 1, button number 2 represents unit 2 and button number 3 represents unit 3. The operator started delivery at a time $t_1$, entered a unit identification, and actuated hose nozzle 50 to deliver 11.0 gallons as of time $t_3$. The operator then momentarily squeezed the hose nozzle again and added another 3.2 gallons to unit 1. The operator then moved the delivery hose to unit 2, before the time $t_5$, and then at the time $t_5$ the operator captured the identification information of unit 2 by using wand 15 to read the information from the button corresponding to that unit. He then delivered an additional 39.5 gallons to unit 2 for an accumulated delivery of 53.7 gallons as of the time $t_6$. The operator then started the delivery to unit 3, captured the button information for unit 3 at a time $t_7$, temporarily stopped at times $t_8$ and $t_9$ at respective incremental volumes of 77.2 and 87.4 gallons, and finally stopped pumping fuel at 99.9 accumulated gallons. The total delivery into unit 3 is 46.2 gallons (99.9–53.7). By way of example, a ticket printed based upon the delivery shown in FIG. 4 may comprise the following information.

Unit 1 . . . 14.2 gallons

Unit 2 . . . 39.5 gallons

Unit 3 . . . 46.2 gallons

A fully formatted ticket may comprise more detail, such as the customer name, telephone number, information regarding the charges per gallon, tax information, and so on.

If accurate information is desired concerning the specific storage tank into which the fuel is transferred, the passive ID device 30 corresponding to that storage tank must be read before the initial zero flow indication for fuel being transferred to that storage tank. Accordingly, the storage tank identifier can be read before commencing the transfer of fuel to that storage tank, or while fuel is being transferred into that storage tank, provided the operator does not wait until a point in time at which the flow of fuel to that storage tank is stopped for any length of time. This provides the operator with great flexibility, and can greatly increase the efficiency with which an operator handles deliveries. Rather than incurring a delay in identifying units before commencing the pumping of fuel into those units, which can add up to a considerable delay within a given shift, the operator can simply put the hose nozzle 50 into the fueling spigot of the appropriate storage tank first, and while fuel is being transferred to the storage tank, capture the unit information with the use of wand 15 (or by other means).

While the invention has been described by way of example embodiments, it is understood that the words which have been used herein are words of description, rather than words of limitation. Changes may be made, within the purview of the appended claims, without departing from the scope and the spirit of the invention in its broader aspects. Although the invention has been described herein with reference to particular structures, materials, and embodiments, it is understood that the invention is not limited to the particulars disclosed. The invention extends to all proper equivalent structures, means and uses.

What is claimed is:

1. A method for delivering fuel to plural customer sites with a delivery truck, said method comprising:

using a delivery hose to transfer fuel from a delivery tank to a customer storage tank of a given customer from among a set of customers;

capturing a given identifier specific to said given customer and capturing another identifier specific to another customer;

sensing a zero flow of said fuel from said delivery tank to said customer storage tank; and determining that the fuel delivery is to be billed to said given customer instead of another customer from among said set of customers based upon when said zero flow is sensed in relation to when said identifier is captured, wherein the given identifier specific to said given customer can be captured after fuel has already commenced transfer to the customer storage tank.

2. The method according to claim 1, further comprising:

using a hand-held device to log, in a memory provided within said hands-held device, said identifier and an identification time at which said identifier is captured;

using a computer on-board said delivery truck to log, in a memory provided on-board said delivery truck, zero flow indications and respective zero flow times at which said zero flow indications occur; and determining which ones of said zero flow times are after said identification time but before a next occurring identification time at which said hand-held device captures a next identifier, wherein said determining comprises determining that delivered fuel is to be billed to said given customer when the delivered fuel leads up to zero flow times following said identification time and preceding said next occurring identification time.

3. The method according to claim 2, wherein said identifier identifies a particular storage tank of said given customer, and said next identifier identifies a next storage tank of said given customer.

4. The method according to claim 2, wherein said identifier identifies a particular storage tank of said given customer, and said next identifier identifies a storage tank of a next customer.

5. The method according to claim 2, further comprising:

designating a begin delivery time;

at said begin delivery time, setting a fuel volume measuring unit to zero; and at each zero flow time, measuring an incremental volume value representing the total fuel delivered since said begin delivery time.

6. The method according to claim 5, wherein for said given storage tank, the identifier of which was captured at said identification time, a volume delivered to said given tank is determined by subtracting, from a latest of said incremental volume values following said given identification time but preceding a next of said identification times, a latest of said incremental volume values preceding said given identification time.

7. The method according to claim 2, wherein said capturing of said identifier specific to said given customer comprises touching a passive ID device with a wand provided on said hand-held device.

8. The method according to claim 7, wherein said passive ID device comprises a non-volatile RAM and said hand-held device comprises a hand-held computer.

9. The method according to claim 8, wherein said passive ID device comprises a touch button comprising a unique storage tank identifier stored in said non-volatile RAM.

10. The method according to claim 2, wherein said capturing of said identifier specific to said given customer comprises touching a bar code with a bar code reading wand coupled to said hand-held device.

11. The method according to claim 2, wherein said capturing of said identifier specific to said given customer comprises an operator uttering a unique identifier into a microphone coupled to said hand-held device.

12. The method according to claim 11, wherein said unique identifier comprises a license plate number of a vehicle being refueled.

13. The method according to claim 2, wherein said capturing of said identifier specific to said given customer comprises an operator inputting a unique identifier into a touch pad of said hand-held device.

14. The method according to claim 13, wherein said unique identifier comprises a license plate number of a vehicle being refueled.

15. A system for delivering fuel to plural customer sites with a delivery truck, said system comprising:

a hand-held device for capturing given identifier specific to a given customer from among a set of customers, the given customer having a customer storage tank to which fuel is to be transferred from a delivery tank, and for capturing another identifier specific to another customer, an on-board subsystem for use on-board the delivery truck, said subsystem comprising a fuel flow sensor and a measuring unit which determines a zero flow of said fuel from said delivery tank to said customer storage tank; and an associating mechanism to determine that the fuel delivery is to be billed to said given customer instead of another customer from among said set of customers based upon when said zero flow is sensed in relation to when said identifier is captured, wherein the given identifier specific to said given customer can be captured after fuel has already commenced transfer to the customer storage tank.

16. The system according to claim 15, wherein:

said hand-held device comprises a hand-held computer comprising a local memory, said hand-held computer logging, in said local memory, said identifier and an identification time at which said identifier is captured;

said on-board subsystem comprises an on-board computer comprises an on-board memory, said on-board computer logging, in said on-board memory, zero flow indications and respective zero flow times at which said zero flow times indications occur; and said hand-held computer and said on-board computer collectively comprise a mechanism for determining which ones of said zero flow times are after said identification time but before a next occurring identification time at which said hand-held device captures a next identifiers.

wherein said associating mechanism determines that delivered fuel is to be billed to said given customer when the delivered fuel leads up to zero flow times following said identification time and preceding said next occurring identification time.

17. The method according to claim 16, wherein said identifier identifies a particular storage tank of said given customer, and said next identifier identifies a next storage tank of said given customer.

18. The method according to claim 16, wherein said identifier identifies a particular storage tank of said given customer, and said next identifier identifies a storage tank of a next customer.

* * * * *